Jan. 30, 1962     E. D. METCALF     3,018,755
METHOD AND APPARATUS FOR MAKING HOSE
Filed Oct. 27, 1958     2 Sheets-Sheet 1
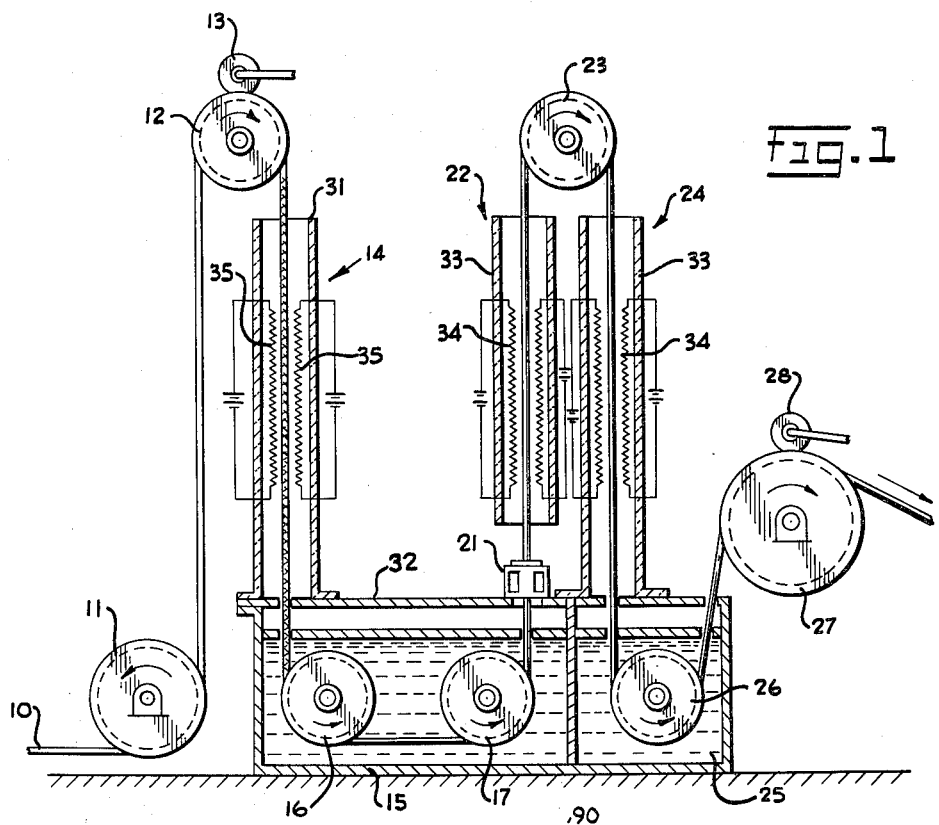
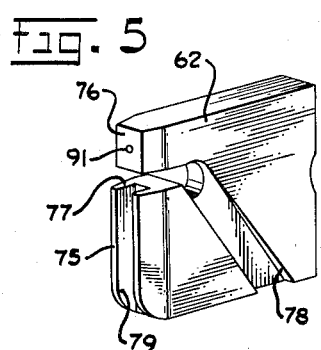
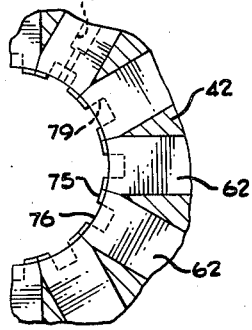
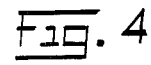
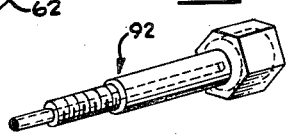
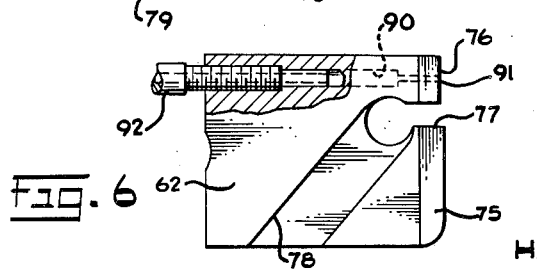
EMERSON D. METCALF
INVENTOR.
BY HIS ATTORNEYS
HARRIS, KIECH, FOSTER & HARRIS Jan. 30, 1962 E. D. METCALF 3,018,755
METHOD AND APPARATUS FOR MAKING HOSE
Filed Oct. 27, 1958 2 Sheets-Sheet 2

EMERSON D. METCALF
INVENTOR.

BY HIS ATTORNEYS

HARRIS, KIECH, FOSTER & HARRIS

United States Patent Office 3,018,755
Patented Jan. 30, 1962

3,018,755
METHOD AND APPARATUS FOR MAKING HOSE
Emerson D. Metcalf, Salem, N.H., assignor to The Borden Company, New York, N.Y., a corporation of New Jersey
Filed Oct. 27, 1958, Ser. No. 769,879
3 Claims. (Cl. 118—125)

This invention relates to a method of and apparatus for making hose and, in particular, for applying an outer coating to a braid reinforced inner core.

It is an object of the invention to provide a process of and apparatus for applying an outer coating to a braid reinforced core which is simpler, less time consuming and less expensive than previous processes and apparatus while providing equally good results. Another object of the invention is to provide such a process and apparatus which permits elimination of the prewetting step and the low pressure or vacuum impregnation step.

A further object of the invention is to provide a method of and apparatus for manufacturing a braid reinforced plastic hose wherein the braid applied to the inner core is heat shrinkable and wherein the braid covered core is heated prior to covering with the liquid outer coating material to shrink the cord material and embed it into the core and to expose a substantial area of the external surface fo the core between the strands of the braid.

It is an object of the invention to provide a wiper die for use in applying the outer coating to the core which wiper die provides control of the thickness of the outer coating regardless of irregularities in the core and/or braid. Another object is to provide such a wiper die having a plurality of radially slideable die plates with each die plate having a leading guide face for engaging the incoming core and a trailing wiper face which is spaced from the core by the guide face for controlling the thickness of the outer coating. A further object is to provide such a wiper die wherein the guide face and wiper face are separated by a liquid reservoir and wherein the guide face has an axial groove therein which does not engage the core permitting transportation of liquid coating to the reservoir.

The present invention is an improvement on that shown in the patent to Stahl, entitled "Method of Making a Multi-Layer Braid Reinforced Hose," No. 2,763,-316. The method of and apparatus for extruding the plastic inner core and applying the braid and the composition of the materials used for the inner core and the outer coating may be the same as those set out in the Stahl patent and will not be described in detail in the present specification.

The invention also comprises novel details of construction and novel combinations and arrangements of parts, together with other objects, advantages, features and results, which will more fully appear in the course of the following description. The drawings merely show and the description merely describes a preferred embodiment of the present invention which is given by way of illustration or example.

In the drawings:

FIG. 1 is a side view, partly in section, of a preferred form of the hose making apparatus of the invention;

FIG. 4 is an enlarged view of a portion of FIG. 2;

FIG. 5 is a perspective view of a die plate of the die of FIG. 2;

FIG. 6 is a side view, partly in section, of a striping die plate; and

FIG. 7 is a perspective view of the striping plug of FIG. 6.

Figure 2:
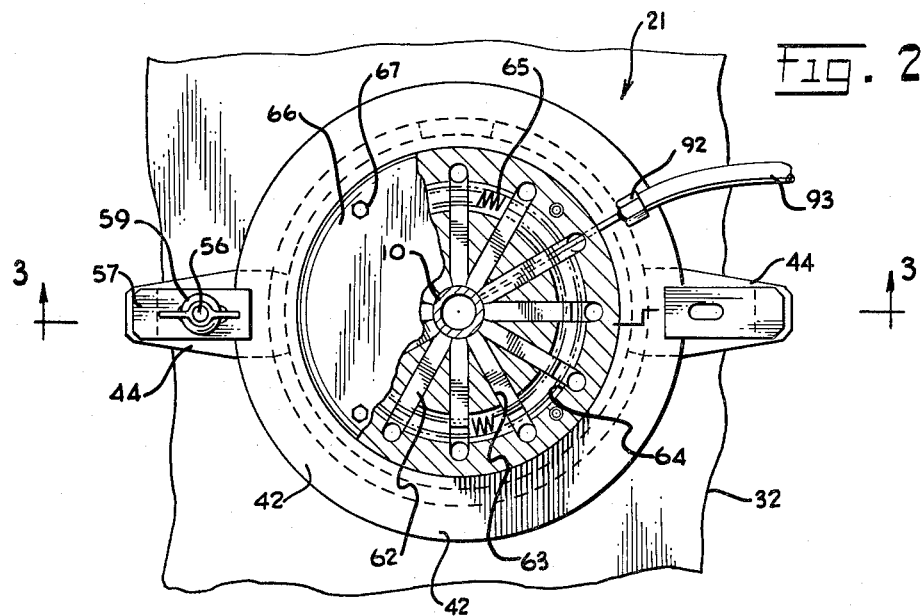
FIG. 2 is a top view, partly in section, of the wiper die of FIG. 1.
Figure 3:
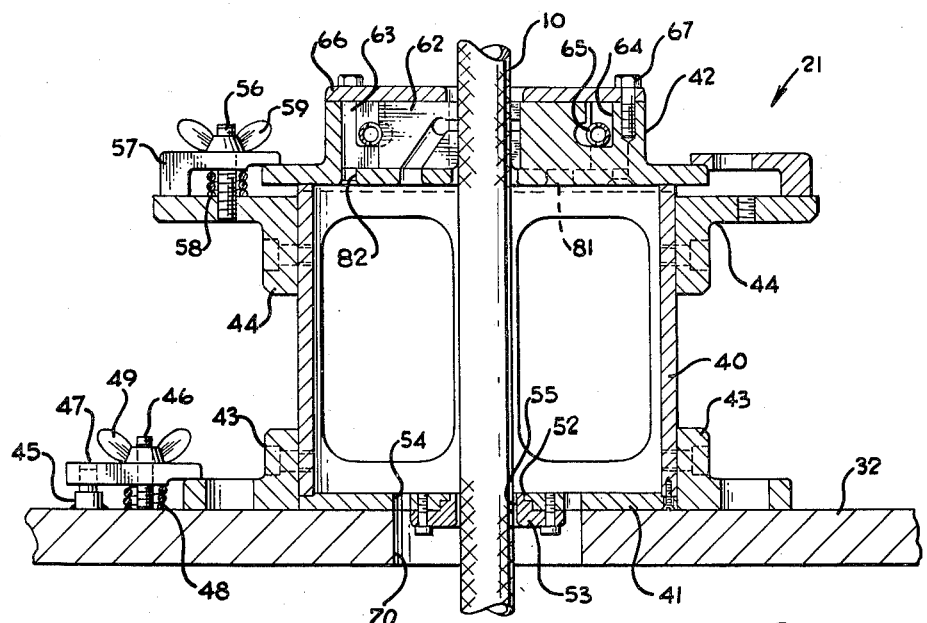
FIG. 3 is a sectional view taken along the line 3—3 of FIG. 2.

A braid covered, plastic hose core 10 is fed into the apparatus of FIG. 1 over a guide sheave 11. The core may be a continuous thermoplastic extrusion with a braid comprising a pattern of crossed strands applied in the usual manner as the core progresses through the apparatus, or the braid covered core may be fed into the apparatus of FIG. 1 from storage reels or the like. The braid is added for the customary purpose of reinforcing the hose. In carrying out the process of the present invention, the cords or strands forming the braid are a heat shrinkable material which contracts longitudinally on exposure to elevated temperatures. A preferred material for the cord is nylon strands which have a length reduction of about 10 percent.

The braid covered core is pulled up over a driven sheave 12 with traction being provided by a tensioning idler wheel 13 which acts to urge the core into engagement with the sheave 12.

The core then moves downward through a heating zone 14 and is pulled through a liquid coating tank 15 by driven sheaves 16, 17. The coated core leaves the tank 15, passing through a wiping die 21, a heating zone 22, over an idler sheave 23 and through a second heating zone 24 into a cooling tank 25. The hose passes over a driven sheave 26 in the cooling tank 25, leaves the tank and proceeds over a driven sheave 27 having a tensioning idler wheel 28 and is then ready for packaging.

In the following discussion of the process carried out by the apparatus of FIG. 1, it should be noted that there is on provision for wetting of the braid covered core with plastisol prior to heating and no provision for passing the plastisol covered core through a vacuum chamber or the like.

The heating zone 14 includes a heating chamber 31 having a suitable source of heat such as electrical heaters 32 positioned therein, the heaters preferably being spaced and energized to provide uniform heating of the core as it passes therethrough. On passing through the heating zone 14, the cords of the braid are shrunk causing them to embed themselves into the wall of the hose core and to expose a substantial area of the external surface of the core between the braid strands. In a typical run, braid covered core is passed through a heating chamber 40 inches in length and heated with 15,000 watts at a rate of 47 feet per minute. This heating produces some contraction of the core as well as pronounced shrinkage of the braid. A core entering the above described heating chamber with an inside diameter of about 0.695 inch emerges with an inside diameter of 0.610 inch. This degree of shrinkage had not previously been felt desirable and in the processes previously employed, great care was taken to prevent shrinkage of the braid prior to applying the outer covering.

The tank 15 contains a suitable plastisol liquid through which the heated core passes. As the core leaves the tank, there is a heavy coating of the viscous liquid adhering thereto. The wiping die 21 is rigidly clamped to an upper plate 32 of the tank 15 as will be shown in detail subsequently. The wiping die removes excess liquid from the core as it passes therethrough, providing the desired uniform outer coating.

The heating zones 22 and 24 are similar in construction and operation to the heating zone 14, each having a heating chamber 33 with electrical heaters 34 positioned therein. The heating zone 22 provides sufficient heat for curing the plastisol outer coating of the hose to a degree that the sheave 23 will not mark the coating. The heating zone 24 provides additional heat for final curing of the hose. The water in the cooling tank 25 is continually changed for cooling the hose after passing through the heating zone. The cured, cooled hose is then ready for storage or packaging and use.

It has been found that the above described process of manufacturing a braid reinforced, plastic covered plastic hose omitting the prewetting step and the intermediate vacuum impregnation step is less expensive and consumes less time than the conventional process while producing hose of equal quality. Since the braid is locked into the hose core as a result of being embedded therein and subsequently the valley or depression caused thereby is filled with the cover material and fused, the result is a hose in which there is little tendency for separation of plies due to braid slippage. The shrinking of the braid also eliminates air bubbles ordinarily trapped by yarn, especially at crossings. This marked improvement in cost and time is achieved by utilizing a heat shrinkable cord for the braid and heating the braid covered core as described above to cause pronounced shrinkage prior to dipping in the coating liquid.

While the process set out above may be carried out with any suitable wiping die, a preferred form of the die 21 is described herein. The wiping die 21 includes a cylindrical shell 40 having a bottom plate 41 and a top plate 42. Lower mounting brackets 43 and upper mounting brackets 44 are fastened to the shell 40 with suitable screws. The die is clamped in position on the plate 32 by a boss 45, a stud 46, a bar 47, a spring 48 and a wing nut 49 for engaging each of the lower brackets 43.

The bottom plate 41 has an opening 52 for receiving a core guide plate 53, and a plurality of small openings 54 circumferentially disposed about the opening 52. The clamping assembly which holds the die to the plate 32 permits lateral movement of the die to locate a central opening 55 in the guide plate 53 in exact alignment with the upcoming hose 10, an opening 70 in the plate 32 providing for this adjustment.

A similar clamping structure comprising a stud 56, a bar 57, a spring 58 and a wing nut 59 is used in conjunction with each of the upper brackets 44 for clamping the top plate to the shell.

A plurality of die plates 62 is positioned in radial slots 63 in the top plate 42 for radial movement toward and away from the hose as it passes through the die. An annular groove 64 in the top plate 42 intersects each of the slots 63 adjacent its outer end. A tension spring 65 is joined together at its ends to form a circular spring and is positioned in the groove 64 for exerting forces on each of the die plates 62 urging it toward the center of the die. A cap 66 is attached to the top plate by screws 67 to retain the die plates in position.

Each of the die plates 62 has a lower spacing face 75 and an upper wiping face 76 (FIGS. 5 and 6). The spacing and wiper faces are separated by a gap 77 which acts as a reservoir for receiving excess liquid. Grooves 78 are provided on each side of the die plate permitting drainage of liquid from the reservoir. A groove 79 is provided in the spacing face 75 and the outer edge of the spacing face 75 is dimensioned to project inward beyond the wiping face 76, as best seen in FIG. 6. The sides of the die plates 62 adjacent the inner end are tapered slightly, as best seen in the enlarged view of FIG. 4, so that when the die plates are moved to their inner limit, they will be in side-to-side abutment with the wiping faces 76 forming a cylindrical surface.

An annular groove 81 in the top plate 42 provides communication between the grooves 78 in the die plates and the interior of the shell 40. Similarly, a circumferential row of openings 82 provides communication between the slots 63 and the interior of the shell 40.

When the hose is passing upward through the wiping die, the spring exerts a uniform pressure on all the die plates, forcing the spacing faces into contact with the hose core. The grooves 79 in the spacing faces permit the hose to carry a quantity of the liquid outer coating upward into the reservoirs formed by the gaps 77. The grooves 79 are dimensioned so that more liquid is carried up than is required for covering the hose to the desired thickness. The wiping faces 76 remove the excess liquid from the hose and form the outer coated surface with the predetermined thickness. The excess liquid drains down through the grooves 78, the groove 81, the shell 40 and the openings 54 and 56 into the tank 15. Any material which leaks out through the slot 63 also drains down through the openings 82 into the shell 40 and so forth. The uniform pressure exerted on the core by the spacing faces 75 of the die plates tends to form the core into a round section. Furthermore, the fixed spacing between the spacing face 75 and the wiping face 76 provides positive control of the thickness of the final coating regardless of the shape of the core thus providing a uniform outer coating even though the braid covered core may have undesired irregularities therein. When a different size of hose is to be coated or a different thickness of coating is desired, it is merely necessary to substitute a new set of die plates for the plates 62 and provide a new guide plate 53 at the lower end of the die.

A stripe of a color different from that of the hose can be provided on the outer coating for identification or decoration purposes. A passage 90 in one of the die plates 62 provides fluid communication between an orifice 91 in the wiping face 76 and a fitting 92 threadedly positioned in the passage 90. Plastisol of the desired color is fed to the fitting 92 under pressure through a line 93, the colored plastisol flowing through the fitting, into the passage 90 and out the orifice 91 onto the outer surface of the hose as it passes through the die.

Although an exemplary embodiment of the invention has been disclosed and discussed, it will be understood that other applications of the invention are possible and that the embodiment disclosed may be subjected to various changes, modifications and substitutions without necessarily departing from the spirit of the invention.

I claim as my invention:

1. In a wiper die for controlling the thickness of a liquid outer coating on a core passing therethrough, the combination of: a laterally movable body having an axial passage for movement of the core therethrough; a plurality of die plates positioned in said body adjacent the exit end of said passage for radial movement relative to said axial passage, each of said die plates having a spacing face and a wiping face axially disposed along the inner surface of the plate, with said faces separated by a liquid reservoir, and with said wiping face positioned downstream from said spacing face, and with said spacing face having at least one axial edge projecting inward beyond said wiping face for engaging the core passing through the die and having at least one axial groove adjacent said edge; a core guide plate carried on said body adjacent the entrance end of said passage and having an opening therein aligned with said passage through which the core passes for positioning the core within said passage; means for draining said reservoirs, and an annular tension spring in engagement with said die plates for urging said die plates toward said axial passage to bring said edges into contact with the core as it moves along said passage.

2. In a wiper die for controlling the thickness of a liquid outer coating on a core passing therethrough, the combination of: a laterally movable body having an axial passage for movement of the core therethrough, an annular groove concentric with said passage, and a plurality of slots extending radially from said passage to said annular groove; a die plate slidingly positioned in each of said slots and extending into said groove, each of said die plates having a spacing face and a wiping face axially disposed along the inner surface of the plate, with said faces separated by a reservoir, and with said wiping face positioned downstream from said spacing face, and with said spacing face having at least one axial edge projecting inward beyond said wiping face for engaging the core passing through the die and having at least one axial groove adjacent said edge; means for draining said reservoirs; and an annular tension spring positioned in said annular groove in engagement with said plurality of die plates for urging said die plates toward said axial passage to bring said edges into contact with the core as it moves along said passage.

3. In a wiper die for controlling the thickness of a liquid outer coating on a core passing therethrough, the combination of: a body having an axial passage for movement of the core therethrough; a plurality of die plates positioned in said body for radial movement relative to said axial passage, each of said die plates having a spacing face and a wiping face axially disposed along the inner surface of the plate, with said faces separated by a liquid reservoir, and with said wiping face positioned downstream from said spacing face, and with said spacing face having at least one axial edge projecting inward beyond said wiping face for engaging the core passing through the die and having at least one axial groove adjacent said edge, one of said die plates having a striping passage therethrough communicating with an orifice in the wiping face thereof; means for supplying a liquid under pressure to said striping passage; means for draining said reservoirs; and means for urging said die plates toward said axial passage to bring said edges into contact with the core as it moves along said axial passage.

References Cited in the file of this patent
UNITED STATES PATENTS

| | | |
|---|---|---|
| 1,727,929 | Berssenbrugge | Sept. 10, 1929 |
| 1,746,580 | Crouse | Feb. 11, 1930 |
| 2,062,389 | Bleibler | Dec. 1, 1936 |
| 2,271,986 | Mungall | Feb. 3, 1942 |
| 2,287,589 | Wilson et al. | June 23, 1942 |
| 2,478,939 | Pope | Aug. 16, 1949 |
| 2,763,316 | Stahl | Sept. 18, 1956 |
| 2,875,725 | Lit et al. | Mar. 3, 1959 |
| 2,892,442 | Bailey | June 30, 1959 |